United States Patent Office 3,464,953
Patented Sept. 2, 1969

3,464,953
STABILIZED POLYOLEFINS
Gordon C. Newland, Kingsport, Tenn., assignor to Eastman Kodak Company, Rochester, N.Y., a corporation of New York
No Drawing. Filed Feb. 14, 1967, Ser. No. 615,886
Int. Cl. C08f 45/58, 45/62
U.S. Cl. 260—45.75
2 Claims

ABSTRACT OF THE DISCLOSURE

There is disclosed a light stabilized plastic composition consisting essentially of (1) a normally solid polymer of an α-olefin having 2–10 carbon atoms and (2) effective stabilizing amounts of the stabilizers (a) a 2-hydroxybenzophenone of the formula

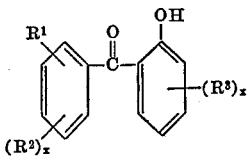

wherein $R^1$ is H or hydroxy, and $R^2$ and $R^3$ are H, hydrocarbyl, hydrocarbyloxy, or acyloxy, and $x$ is 1 or 2, combined with one or more of (b) a nickel chelate of a β-diketone of the formula

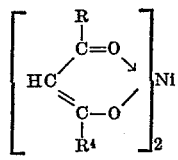

wherein R and $R^4$ are alkyl, and (c) a nickel chelate of an N-salicylideneamine of the formula

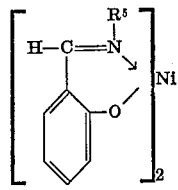

where $R^5$ is hydrocarbyl, methods of preparing such compositions, and articles manufactured therefrom.

---

This invention relates to stabilized plastic compositions and, more particularly, to ultraviolet light stabilized plastic compositions.

Polyolefins, particularly polypropylene, have been found to exhibit poor resistance to long term weathering, as in resistance to long term exposure to ultraviolet radiation. Although the incorporation of ultraviolet stabilizers in polypropylene improves its resistance to degradation, it has been found in some cases that sufficient amounts of a given stabilizer cannot be used without blooming, exudation or migration of the stabilizer because of limited compatibility. In other instances, the cost of the stabilizers is too great to permit the use of large amounts. "Weathering" is inclusive of other degradative agencies than ultraviolet radiation, and weathering in its broader aspects, as well as desirable qualities of stabilizers for polyolefins, are discussed below.

The stabilizing and preservation agents useful in accordance with the invention prevent or minimize changes in the polymers caused or induced by one or more environmental factors such as climate and abnormal temperatures, visible and invisible wave energy, exposure to or the presence of deterioration- inducing or reactive materials and solvents for the compounded polymer or components thereof and biological attack. Such changes fall within a number of areas. Thus, changes in flexural and tensile properties, strength properties in general, and the integrity of plastic bodies present a common problem. Changes in macromolecular structure and composition as well as changes in homogeneity of the compounded or raw polymer are also encountered. Appearance is not the least of the properties which may change, and this area includes color and surface characteristics, such as fading, crazing, cracking, and changes in hardness, such as embrittlement and softening.

The term weathering is inclusive of many alterations which may take place, since exposure to the elements and air or polluted air involves temperature changes, exposure to moisture and biological attack, exposure to wave energy such as sunlight and ultraviouet light, contact with reactive materials in air such as sulfur oxides and other sulfur compounds, peroxides, oxygen, and ozne, and dissolution, leaching or exudation of compounding ingredients. As used herein, the term "weathering" is intended to denote exposure to such conditions which may result in such changes. One form of weathering is photochemical degradation of polymers when exposed to sunlight, particularly ultraviolet light, and air, which appears to be a photooxidation process causing rupture of the polymer chain, formation of carbonyl (=C=O) groups, or other changes. As this degradation processes, articles manufactured from these polymers, particularly those having thin cross sections, such as fibers and films, tend to crack, become brittle and lose tensile strength to the extent of mechanical failure.

Some changes may arise from polymer structure and impurities therein. Thus, unsaturation in the polymer and branching of the polymer provides potential sites for changes, such as crosslinking, depolymerization, or other changes, and impurities such as traces of metal or compounds thereof from catalyst residues and equipment corrosion may catalyze or otherwise induce alteration of the polymer.

Conditions inducing heat and oxygen degradation may be encountered in the utilization of the product in areas such as electrical insulation and during manufacturing processes utilizing the polymer. Thus, in milling, melt extruding, and in procedures such as compression molding, rolling, pressure deforming, calendering, or compounding of the polymer, high temperatures and exposure to air are commonly encountered and may result in heat and oxygen degradation of the polymer.

It is common knowledge in the art that stabilizers known to be useful for one material, polymer or plastic may or may not be useful in another environment, that is, for another material, polymer or plastic. Thus, stabilizers for a synthetic rubber are not presumed to be stabilizers for other polymers in the absence of extensive experimentation. Similarly, compounds which may be added to a given polymer and which confer stabilization against the deteriorative effect of ultraviolet light may have little or no effect in inhibiting thermal oxidation. The converse is true in that compounds which are excellent inhibitors of thermal oxidation may be of little or no benefit in stabilizing against deterioration by ultraviolent light.

The stabilizers must not only be effective, but also must have certain properties. For instance, they must be compatible with the polymer and compounding ingredients in effective amounts, and they are preferably nonmigratory, or do not result in blooming or exudation. They of course must resist weathering. They should be colorless or aesthetically pleasing, and if colored, should be non-fading and have a stable color when subjected to heat or light. Of further importance is that the additive compounds should be non-destructive of, or should enhance, desirable polymer properties such as electrical properties, adhesives or nonadhesiveness, and so forth. Toxicity and odor or lack thereof are desirable depending upon utility, e.g., in products subject to biological attack or subject to insect or rodent damage, or products which come into contact with comestibles or living tissue.

One object of the present invention is the provision of stabilized compositions in which one or more of the changes mentioned heretofore, but not necessarily all of such changes, are prevented or inhibited by the utilization of said stabilizing materials.

It is another object of this invention to provide new poly-α-olefin compositions having enhanced resistance to degradation by environmental conditions, particularly to degradation by ultraviolet light, weathering, and conditions encountered during manufacturing processes, and to provide stabilized articles and methods for their preparation.

Another object of the invention is to provide a polyolefin composition of α-olefins having at least two carbon atoms, and particularly polyethylene and polypropylene, having a high resistance to degradation by long term ultraviolet radiation, methods for their preparation, and articles formed thereof.

Yet another object of this invention is to provide stabilized polypropylene and other polymers and copolymers of α-olefins having from 2–10 carbon atoms, in which a plurality of the stabilizing compounds are used, which give a better stabilizing effect than would be expected from the effect of each use as the sole stabilizer.

This invention relates to combinations of certain hydroxybenzophenones with either certain nickel chelates of β-diketones or certain nickel chelates of certain N-salicylideneamines to give a synergistic effect when used as ultraviolet light stabilizers for normally solid polymers of α-olefins having 2–10 carbon atoms.

In summary, this invention comprises a light stabilized, plastic composition consisting essentially of (1) a normally solid polymer of an α-olefin having 2–10 carbon atoms and (2) effective stabilizing amounts of the stabilizers (a) a 2-hydroxybenzophenone of the formula

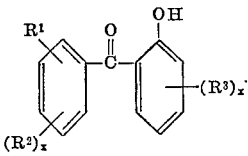

wherein $R^1$ is H or hydroxy, and $R^2$ and $R^3$ are H, hydrocarbyl, hydrocarbyloxy, or acyloxy, and $x$ is 1 or 2, said radicals having up to about 20 carbon atoms, combined with one or more of (b) a nickel chelate of a β-diketone, the chelate having the formula

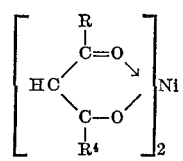

wherein R and $R^4$ are alkyl of from 1 to about 12 carbon atoms, and (c) a nickel chelate of an N-salicylideneamine, the chelate having the formula

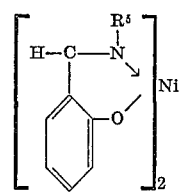

wherein $R^5$ is hydrocarbyl of from 1 to about 20 carbon atoms, methods of preparing such compositions, and articles manufactured therefrom.

The normally solid polymer of an α-olefin having 2–10 carbon atoms comprises both high density and low density, normally solid, homopolymers and copolymers of α-monoolefins having 2–10 carbon atoms. Examples of such polymers are the normally solid homopolymers and copolymers of ethylene, propylene, butene-1, isobutylene, pentene-1, 2-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, styrene, allylbenzene and the like. Processes for preparing these polymers are well known and described in detail in the prior art. See, for example, the U.S. Patent, No. 2,912,424, of Cash and the U.S. Patent, No. 2,917,500, of Hagemeyer et al., which describe typical catalytic processes for the preparation of normally solid homopolymers and copolymers of these α-olefins. In general, the α-olefin polymers of this invention are thermoplastic, normally solid, synthetic resins having average molecular weights of at least about nine thousand. In the average molecular weight range from about nine thousand to about twelve thousand these polymers generally are wax-like at room temperature while above an average molecular weight of about twelve thousand these polymers have greater consistencies.

The invention, as to copolymers, includes stabilization and compounding of random copolymers of ethylene, propylene, and other α-olefins as defined herein, as well as of substantially crystalline (substantially insoluble in boiling hexane) or stereoregular block copolymers of propylene and/or ethylene with one another or other α-olefins.

Although the composition of this invention need comprise only one polymer of an α-olefin having 2–10 carbon atoms, specific embodiments of this composition include normally solid blends of α-olefins having 2–10 carbon atoms.

Concentration of the stabilizers in the plastic composition of this invention depends generally upon the extent of light stabilization desired. This in turn depends upon many variables, including the end use of the plastic composition. However, for most end uses a concentration generally in a range from about 0.1 to about 10% by weight of the α-olefin polymer content of the composition and preferably in a range from about 0.5 to about 5% by weight of the α-olefin polymer content of the composition is an effective or protective concentration. Each of the two or more synergistic stabilizers is used in an amount of at least about 0.05% by weight of the polymer.

The plastic composition of this invention is prepared by incorporating the stabilizers into the α-olefin polymeric portion of the composition. Generally, such incorporation is performed by any one of a number of well-known methods, such as roll compounding, extrusion, solvent mixing and the like. For example, such incorporation can be performed by heating or otherwise softening the α-olefin polymeric portion to a workable consistency and then working in as by roll compounding until a substantially uniform mixture or dispersion is obtained. When the formula of a specific embodiment of the composition of this invention calls for other conventional additives such as, for example, antioxidants, heat stabilizers, property improvers, pigments, slip agents, antiblock agents, fillers, extenders and the like, they are usually incorporated into the α-olefin polymeric portion of the composition at the same time as the ultraviolet stabilizers.

The resulting plastic composition is cast or molded into the desired article or articles such as, for example, pellets, sheeting, films, fibers, bars, bristles, specifically shaped structural elements and the like, as by conventional casting and molding techniques which include extrusion, blow molding and the like.

The nickel chelates found to be useful are of β-diketones such as acetylacetone or of N-salicylideneamines, such as p-dodecylaniline. Said β-diketones may be represented by the formula

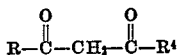

wherein R and R⁴ are alkyl of from 1 to about 12 carbon atoms, examples of which are methyl, ethyl and octyl. The preferred chelate is nickel acetylacetonate, although the nickel chelates of for instance 1,3-hexadione, or of 3,5-nonadione and the like may be utilized. Such chelates are described by Moeller, Inorganic Chemistry, pp. 237–242, John Wiley and Sons, Inc., New York, N.Y. (1952). Such chelates may be represented by the formula

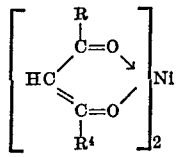

wherein R and R⁴ have the meaning given above.

The N-salicylidene-amines may be represented by the formula

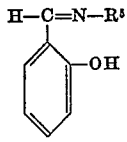

wherein R⁵ is hydrocarbyl of from about 1 to about 20 carbon atoms, preferably at least 6 carbon atoms.

The chelates of the N-salicylideneamines may be represented by the formula

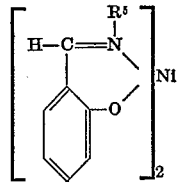

The preferred radical R⁵ is p-dodecylphenyl. Other examples are phenyl, dodecyl, octadecyl, benzyl, and the like alkyl, aryl, aralkyl, and alkaryl radicals, having from 1 to about 20 carbon atoms preferably, at least 6 carbon atoms.

The 2-hydroxybenzophenone compounds useful according to the invention may be represented by the formula

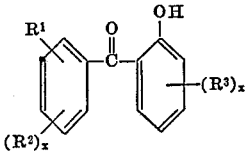

wherein R¹ is H or hydroxy, and R² and R³ are H, hydrocarbyl, hydrocarbyloxy, or acyloxy, and x is 1 or 2, said radicals having up to about 20 carbon atoms.

Particularly preferred stabilizers useful in the present invention are the 2-hydroxy-4-alkoxybenzophenones, especially 2-hydroxy-4-dodecyloxybenzophenone.

Suitable hydrocarbyl radicals R₂ and R₃ include the preferred straight chain or branched chain alkyl, as well as cycloalkyl, aryl, aralkyl, alkaryl, alkenyl, and alkynyl, having from 1 to about 20 carbon atoms, preferably from about 6 to about 20 carbon atoms. Examples of hydrocarbyl radicals useful according to the invention are methyl, ethyl, propyl, isobutyl, octyl, isononyl, dodecyl, cyclohexyl, cyclooctyl, cyclododecyl, octadecyl, tetradecyl, pentadecyl, 1,1,3,3-tetramethylbutyl, 2,2-dimethylhexyl, phenyl, biphenyl, benzyl, p-tolyl, vinyl, butenyl, allyl and ethynyl.

Particularly preferred as the radical R³ are alkyloxy radicals, the hydrocarbyl portion of the hydrocarbyloxy radical being as defined above for the hydroxyhydrocarbylbenzophenones. Examples of useful hydroxyhydrocarbyloxybenzophenones are 2-hydroxy-4-methoxybenzophenone, 2-hydroxy-4-ethoxybenzophenone, 2-hydroxy-4-propoxybenzophenone, 2-hydroxy-4-butoxybenzophenone 2-hydroxy-4-pentoxybenzophenone, 2-hydroxy-4-octyloxybenzophenone, 2-hydroxy-4-nonyloxybenzophenone, 2-hydroxy - 4 - hexadecyloxybenzophenone, 2-hydroxy-4-dodecyloxybenzophenone, 2-hydroxy-4-octadecyloxybenzophenone, 2,2'-dihydroxy-4,4'-dimethoxybenzophenone, 2-hydroxy-4-tetradecyloxybenzophenone, 2 - hydroxy-4-hexyloxybenzophenone, 2 - hydroxy-4-heptyloxybenzophenone, 2-hydroxy-4-hexadecyloxybenzophenone, and 2-hydroxy-5-benzyloxybenzophenone. Examples of compounds having more than one type of radical discussed above are 2-hydroxy-4-methoxy-4'-dodecylbenzophenone and 2-2'-dihydroxy-4,4'-dimethyl-5'-dodecyloxybenzophenone.

Among the suitable acyloxy derivatives of hydroxybenzophenones are 2-hydroxy-4-acetoxybenzophenone, 2-hydroxy-4-lauroxybenzophenone, 2 - hydroxy-4-stearoxybenzophenone, 2-hydroxy-4,4'-dimyristoxybenzophenone, 2-hydroxy-4,4'-distearoxybenzophenone, 2-hydroxybenzophenone-4-acrylate, and 2-hydroxybenzophenone-4-methacrylate.

This invention is further illustrated by the following examples of various aspects thereof, including specific embodiments. Unless otherwise indicated this invention is not limited to these embodiments.

EXAMPLE 1

Polypropylene of inherent viscosity of 1.1 was mixed in an inert atmosphere with the additives to be tested in a C. W. Brabender Plastograph at 325° F. The resultant slab was granulated and injection molded at 425° F. into ¹⁄₁₆-in. thick tensile bars 2.5 in. long. The tensile bars were bent into a U and inserted upside down in a ⅝-in. wide stainless steel channel and exposed in an Atlas Twin-Arc Weather-Ometer, modified with ten 20-watt Westinghouse fluorscent sunlamps, [Anal. Chem. 25, 460 (1953)]. Three specimens of each composition was exposed and the stress-crack life measured as the averaged exposure hours required to develop cracks in the three specimens. Cracks were defined to have developed on the surface of the stressed specimen when they were visible under 3x magnification.

The results are shown in the following table:

| Concn. of 2-hydroxy-4-dodecyloxy-benzophenone, percent | Other additive | Concn. other additive, percent | Stress-crack life, hr. |
| --- | --- | --- | --- |
| 0 | None | | 90 |
| 0.5 | do | | 725 |
| 1.0 | do | | 1,760 |
| 0 | Nickel acetylacetonate | 1.0 | 520 |
| 0 | Nickel chelate of N-salicylidene-p-dodecyl-aniline | 1.0 | 1,150 |
| 0 | Nickel chelate of ethylbenzoyl acetate | 1.0 | 90 |
| 0 | Zinc acetylacetonate | 1.0 | 90 |
| 0.5 | Nickel acetylacetonate | 0.5 | 2,515 |
| 0.5 | Nickel chelate of N-salicylidene-p-dodecylaniline | 0.5 | 1,572 |
| 0.5 | Nickel chelate of ethylbenzoyl acetate | 0.5 | 330 |
| 0.5 | Zinc acetylacetonate | 0.5 | 425 |
| 0 | Nickel acetylacetonate | 0.5 | 240 |
| 0 | Nickel chelate of N-salicylidene-p-dodecylaniline | 0.5 | 480 |
| 0 | Nickel chelate of ethylbenzoyl acetate | 0.5 | 90 |
| 0 | Zinc acetylacetonate | 0.5 | 90 |

It will be noted that the combinations of the invention gave a synergistic stabilizing effect.

In contrast, mixtures of nickel chelate of ethylbenzoyl acetate or zinc acetylacetonate with 2-hydroxy-4-dodecyloxybenzophenone were not synergistic and were, in fact, found to have less stabilizing action than the benzophenone portion of the mixture alone.

As shown in the table, polypropylene compositions stabilized with mixtures of 0.5% of each of two stabilizers of the invention were found to be more stable than those stabilized with 1% of either component alone. In the cases of mixtures 2-hydroxy-4-dodecyloxybenzophenone with nickel acetylacetonate the stabilization obtained was outstanding.

EXAMPLE 2

Tenite polyethylene 800 was hot-roll-compounded with the additives to be evaluated. Films, 5-mil thick, were compression molded from the roll slab at 300° F. Specimens 0.5 x 2.5 in. were cut from the films and exposed to the conditions present in an Atlas Weather-Ometer, type XWR. The films were defined to be brittle at the exposure term wherein they broke on creasing with the exposed side on the outside of the crease. The compositions tested and the results obtained are summarized in the accompanying table.

WEATHERING OF POLYETHYLENE IN AN ATLAS WEATHER-OMETER

| Additive | Conc., percent (by wt.) | Exposure to embrittlement, hr. |
|---|---|---|
| None | | 600 |
| 2-hydroxy-4-dodecyloxy-benzophenone | .5 | 1,200 |
| Ni-acetylacetonate | .5 | 240 |
| Ni-N-salicylidene-dodecylamine | .5 | 1,000 |
| Ni-5-nitrosalicylideneaniline | .5 | 540 |
| Ni-decylacetoacetate | .5 | 320 |
| 2-hydroxy-4-dodecyloxybenzophenone plus Ni-acetylacetonate | .5 .5 | ¹2,340> |
| 2-hydroxy-4-dodecyloxybenzophenone plus Ni-N-salicylidene-dodecylamine | .5 .5 | >2,340 |
| 2-hydroxy-4-dodecyloxybenzophenone plus Ni-5-nitrosalicylideneaniline | .5 .5 | >2,340 |
| 2-hydroxy-4-dodecyloxybenzophenone plus Ni-decylacetoacetate | .5 .5 | 2,340 |

¹ Greater than present exposure term.

As shown in the table, the combination of benzophenone derivative and the nickel chelate were more effective in stabilizing the polyethylene than either of the components alone. The chelates Ni-acetylacetonate and Ni-decylacetoacetate were found to be accelerators of weathering when used alone in the polyethylene. However, the compositions containing combinations of these accelerators with the benzophenone had better stability than that expected from the additive effects of the separate additives.

Thus having described the invention in detail it will be understood that certain variations and modifications may be made by those skilled in the art without departing from the spirit and scope of the invention as defined herein and in the appended claims.

I claim:
1. A composition comprising a poly-α-olefin derived from mono-α-olefins having 2 to 10 carbon atoms and a stabilizing amount of a stabilizer combination comprising:
(A) a 2-hydroxybenzophenone of the formula

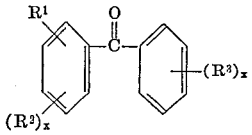

wherein $x$ is 1 or 2, $R^1$ is H or hydroxy, and $R^2$ and $R^3$ are H, hydrocarbyl radicals, hydrocarbyloxy radicals, or acyloxy radicals, said radicals having up to 20 carbon atoms, and
(B) a nickel chelate of a β-diketone having the formula

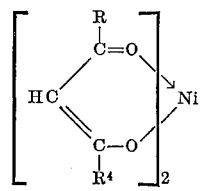

wherein R and $R^4$ are alkyl radicals having 1 to 12 carbon atoms.

2. A composition according to claim 1 wherein said poly-α-olefin is polyethylene, polypropylene, or a copolymer of ethylene and propylene, and said stabilizer combination comprises a 2-hydroxy-4-alkoxybenzophenone and a nickel acetylacetonate.

References Cited

UNITED STATES PATENTS

| 2,615,860 | 10/1952 | Burgess | 260—45.75 |
| 2,665,265 | 1/1954 | Burgess | 260—45.75 |
| 2,972,597 | 2/1961 | Newland | 260—45.85 |
| 2,980,645 | 4/1961 | Newland | 260—45.75 |
| 3,214,399 | 10/1965 | Saccomandi | 260—23 |
| 2,985,617 | 5/1961 | Salyer et al. | 260—45.7 |

DONALD E. CZAJA, Primary Examiner

V. P. HOKE, Assistant Examiner

U.S. Cl. X.R.

260—45.95